UNITED STATES PATENT OFFICE.

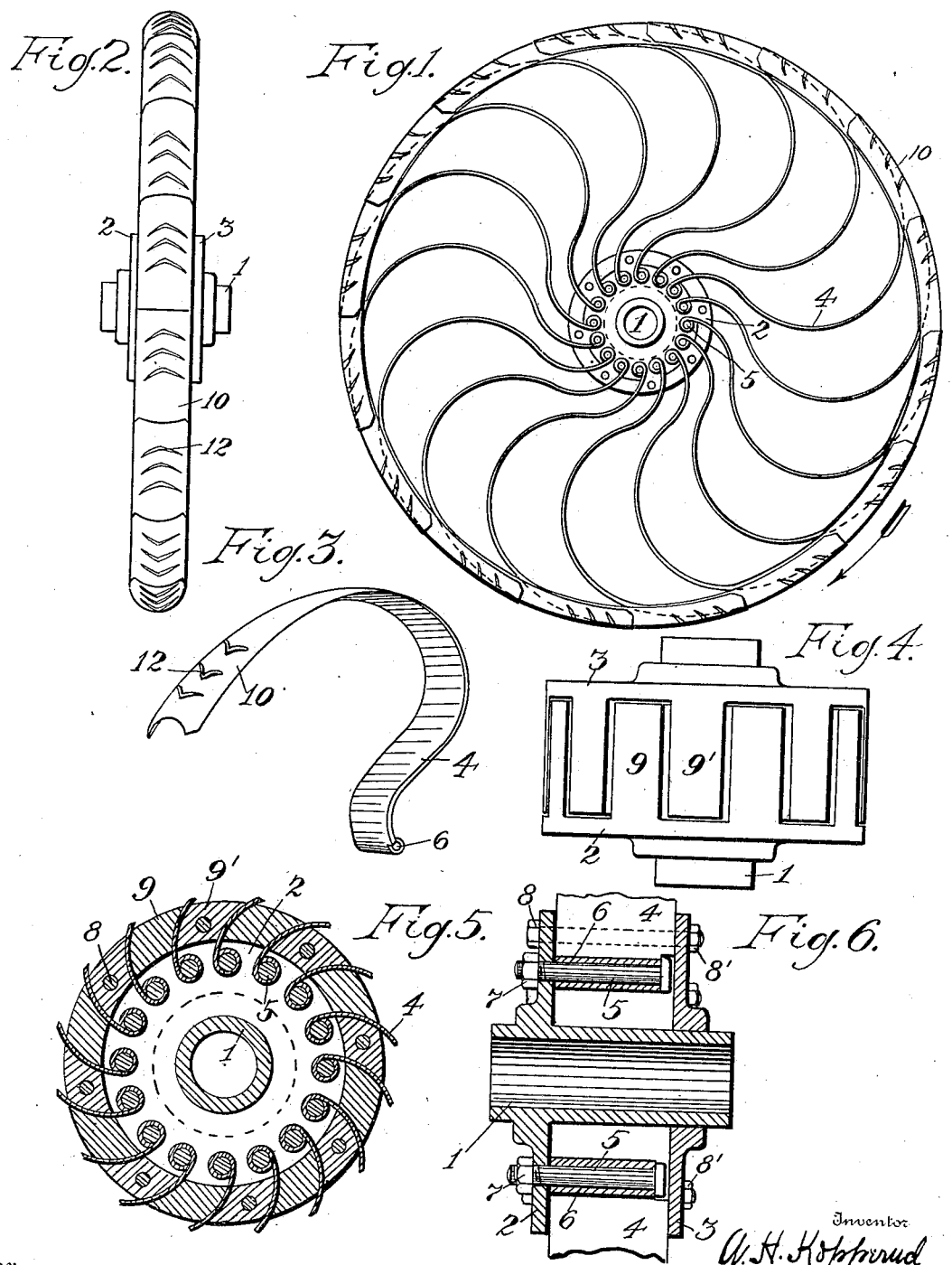

ANDERS H. KOPPERUD, OF BYRON, CALIFORNIA.

VEHICLE-WHEEL.

No. 830,083.  Specification of Letters Patent.  Patented Sept. 4, 1906.

Application filed July 10, 1905. Serial No. 268,978.

*To all whom it may concern:*

Be it known that I, ANDERS H. KOPPERUD, a citizen of the United States, residing at Byron, county of Contra Costa, State of California, have invented certain new and useful Improvements in Vehicle-Wheels; and I hereby declare the following to be a full, clear, and exact description of the same.

The present invention is mainly designed to serve as a substitute for the expensive rubber-tired wheels at present used in connection with automobiles, the object being to provide an inexpensive, durable, and efficient metallic spring-wheel for automobiles.

The hereinafter-described wheel consists of a suitable hub, from which spring a series of curved metallic spokes, the outer end portion of each spoke being rearwardly curved and, together with such portion of the remaining spokes, forming the tread of the wheel, said tread consisting of a series of independent tread-sections.

To comprehend the invention, reference should be had to the accompanying sheet of drawings, wherein—

Figure 1 is a side view in elevation. Fig. 2 is a front view of the wheel. Fig. 3 is a detail view of one of the metallic spokes. Fig. 4 is a detail view of the hub of the wheel with the spokes removed therefrom. Fig. 5 is a vertical sectional view of the hub, illustrating the spokes secured therein; and Fig. 6 is a longitudinal sectional view of the hub, the spokes being secured therein.

The numeral 1 designates the hub of the wheel, and 2 3 the cheek, or side plates thereof. Between these plates the inner ends of the spokes 4 are secured, said spokes being secured to the cheek-plate 2 by means of the pins or studs 5. These studs or pins extend within the eye 6 of the spokes and through the said cheek-plate 2, being secured in position by means of the nut 7, which screws onto the screw-threaded projecting end of the said pins or studs. The united ends of the spokes 4 are covered and held in place by means of the cheek-plate 3, which plate slips onto the hub 1 and is united to the plate 2 through the medium of the securing-bolts 8. These bolts extend through the said cheek-plates, passing between the inner end portions of the spokes, and are drawn tight by means of the nuts 8'. The cheek-plates are formed with the projecting tongues 9 9' which when the plates are brought together interlock one with the other and form a bearing for the inner end portion of the spokes, which pass between the said tongues.

The spokes 4 are formed of spring metal and preferably the center or body portion of each spoke is curved forwardly, so as to give requisite resiliency thereto. The outer end portion of each spoke is rearwardly curved on the arc of a circle, thereby providing a curved tread-section 10 to each spoke, which tread-sections when the spokes are properly positioned form an outer metallic tread for the wheel. The inner face of each tread-section is channeled or grooved on its inner face, the outer face thereof being slightly rounding. The spokes are so shaped and located relative to each other that approximately one-half of each tread-section 10 rests within the grooved or channeled portion of the tread-section of the preceding spoke, while its outer portion overlaps the inner portion of the tread-section of the subsequent spoke, the tread-sections thus interlocking one with the other, and forming a continuous outer tread for the wheel.

To aid or assist in the climbing of hills, the outer exposed portion of each tread-section is formed with one or more projecting ribs 12.

It will be understood that the end of each tread-section terminates in a feather-edge, thereby giving substantially an even surface to the wheel's tread.

It will be understood that the shape of the spokes may be changed or modified, as desired.

In case of a spoke breaking or becoming damaged the same may be readily replaced. To this end it is only required to separate the cheek-plates 2 3, remove the pin or stud 5 securing such damaged spoke, detach the said spoke, and insert a new one in place thereof, the parts then being replaced to secure the spoke in proper position.

The feature of the invention is the forming of a resilient wheel from a series of spokes, each spoke comprising an independent tread-section, which tread-sections interlock one with the other, so as to form a continuous outer tread.

While I have described my invention as particularly adapted to vehicle-wheels, it is obvious that it may also be adapted to pulley or other wheels when it is desirable to have a resilient tread-surface.

Having thus described the invention, what is claimed as new, and desired to be protected by Letters Patent, is—

1. A resilient wheel having the spokes thereof extended to form a yieldable tread-surface and provided with traction-lugs.

2. A resilient wheel comprising a hub and yieldable spokes secured to the hub and having their free ends overlapping to form a tread-surface and provided with traction devices.

3. A resilient vehicle-wheel comprising a hub, and a series of spring-spokes, extending radially therefrom and having their outer ends bent rearwardly to form tread-sections, the outer surfaces of said tread-sections being provided with projecting portions.

4. A spring-wheel comprising a hub, a series of radially-disposed spring-spokes secured thereto at their inner ends and having their outer ends bent rearwardly to form tread-sections, the tread-sections of adjacent spokes overlapping to form a continuous tread-surface and having their outer surfaces provided with projecting portions.

5. A spring-wheel comprising a hub, a series of radially-disposed spring-spokes connected thereto at their inner ends and having their outer ends bent rearwardly on the arc of a circle to form tread-sections, concavo-convex in cross-section, the tread-sections of each spoke being arranged to overlap and interlock with the tread-sections of the adjacent spoke for an appreciable portion of the length thereof.

6. A resilient vehicle-wheel, the same consisting of a suitable hub, a series of radial metallic spring-spokes detachably united thereto, a tread-section for each wheel-spoke, the tread-section of one spoke interlocking with that of the preceding spoke and overlapping a portion of the tread-section of the subsequent spoke, and one or more ribs formed on the outer surface of each tread-section.

7. A resilient vehicle-wheel comprising a hub and a series of spring-spokes extending substantially radially therefrom, the body portions of said spokes being curved forwardly and the end of said spokes being curved rearwardly on the arc of a circle to form tread-sections directly overlying the connection of their respective spokes with the hub, the tread-sections of adjacent spokes being arranged to overlap and provided with portions adapted to interlock to prevent lateral movement thereof.

In testimony whereof I have hereunto affixed my signature in the presence of two witnesses.

ANDERS H. KOPPERUD.

Witnesses:
WM. BOYDSTON,
ROY L. MCCABE.